June 3, 1969   L. L. LOWE   3,447,727
CLAMP SUPPORTS FOR AUTOMOBILE ROCKER PANELS
Filed April 6, 1967

INVENTOR.
Lyall L. Lowe

United States Patent Office 3,447,727
Patented June 3, 1969

1

3,447,727
CLAMP SUPPORTS FOR AUTOMOBILE ROCKER PANELS
Lyall L. Lowe, 517 Dakota Ave.,
South Sioux City, Nebr. 68776
Filed Apr. 6, 1967, Ser. No. 629,029
Int. Cl. B60r 11/100; A47b 97/00
U.S. Cl. 224—42.1                                3 Claims

ABSTRACT OF THE DISCLOSURE

The invention relates to support structure adapted to be attached to lower automobile framework structure. The support structure includes spaced apart clamps which engage the framework structure, elongated members extending between the clamps, and load support members on the elongated members for supporting a load above the automobile.

---

My invention relates to automobile clamp supports for rocker panels especially.

An object of my invention is to provide certain clamps which can be conveniently used for efficiently supporting camping units or any other type of structure from the lower framework portions of an automobile.

A further object of my invention is to provide relatively simple clamp members which can be clamped onto easily accessible portions without the necessity of working beneath the automobile and the like.

A further object of my invention is to provide such clamp supports or the associated structure therewith in devices which are not at all in the way of the occupants of the automobile, etc.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

My invention contemplates the provision of readily attachable clamps and other arrangements for supporting relatively heavy structures from an automobile and from a lower portion thereof so as to eliminate the necessity of having any weight on the car top, unless desired.

Figure 3:
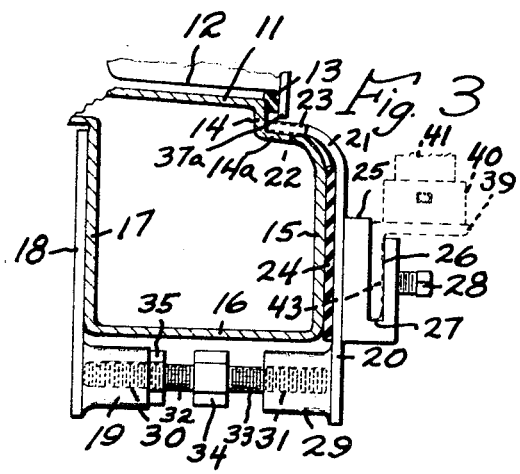
FIGURE 3 is a sectional view of a rocker panel and showing my clamps attached thereto.
Figure 5:
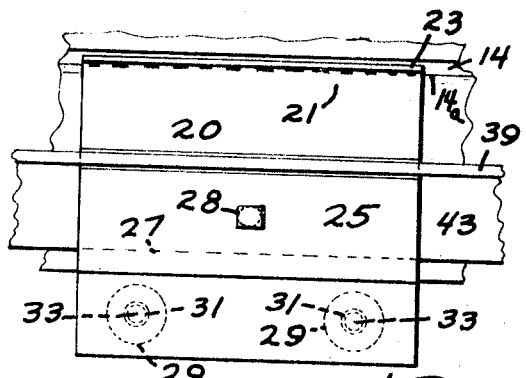
FIGURE 5 is a side view of FIGURE 3.
Figure 4:
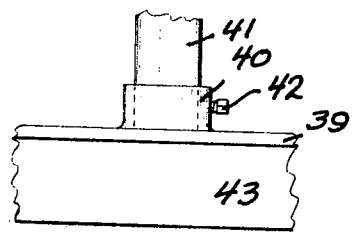
FIGURE 4 is a detail.

In describing my invention, I have used the character 10 to indicate generally, by dotted lines, the automobile itself to which my unit is to be attached and I have used the character 11 (see FIGURE 3) to indicate the lower rocker panel upon which the bottom 12 of the doors of the vehicle will engage, the character 13 indicating the usual gasket of the door. I have further used the character 14 to indicate a vertical portion of the automobile framework structure which extends from the portion 11, the character 14a indicating a horizontal portion and the character 15 indicating a side wall, the character 16 a bottom wall and the character 17 a further vertical wall spaced

2 from the wall 15 as shown, this structure being substantially the cross-sectional shape of the automobile at the portions below the door.

In describing my clamps, I have used the character 18 to indicate a flat vertical plate and securely welded or otherwise attached to the plate 18 are the two spaced bosses 19, and I have further used the character 20 to indicate a further vertically positioned plate having the arcuate portion at 21 terminating in the horizontally positioned portion 22 having a protecting cover 23, and attached to the plate 20 is a resilient member or plate 24. Also attached to the plate 20 is the bar 25 which includes an elongated slot portion 26 terminating at 27, a set screw 28 being threadably engaged with the bar 25. Attached to the plate 20 are a further pair of bosses 29, the bosses 19 and 29 having the oppositely pitched threads 30 and 31, with which threads are engaged a pair of studs 32 and 33 having similarly pitched threads, the character 34 indicating turning nuts attached to the studs 32 and 33, the character 35 indicating a lock nut.

In many cases, it is desired to transport a camping outfit on the top of a vehicle, and in order to provide sufficient strength for such support, I attach the above described clamps to the vehicle at substantially the points shown in FIGURES 1 and 2, or adjacently to and below the doors 36 and 37 of the vehicle, since the portions 14a, etc. above described are just beneath the door portions 37a, and are accessible for these clamps to be attached for this purpose.

Figure 1:
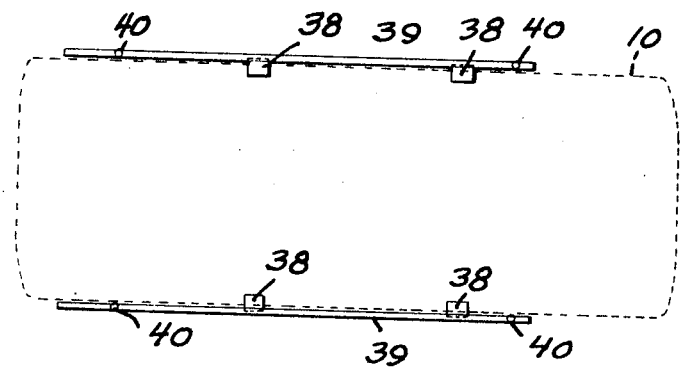
FIGURE 1 is a general plan view of an automobile utilizing my supports.
Figure 2:
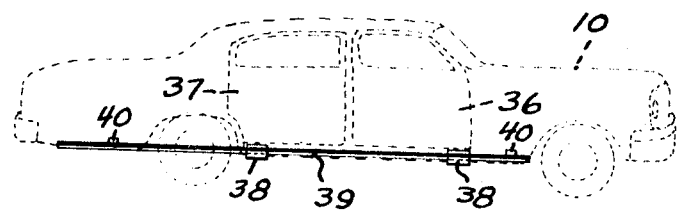
FIGURE 2 is a side elevation of FIGURE 1.

In FIGURES 1 and 2, the clamps are indicated generally by the character 38 and indicate the approximate position of the same with relation to the automobile. In order to complete the structure for supporting the above mentioned frameworks or other units, I provide the lengthened angle shaped members 39 to which are attached the sockets 40, and received within the sockets 40 of which there will be four as shown, are the posts 41 which can be secured by means of the set screws 42, it being noted that the vertical flanges 43 of the angle members 39 are inserted within the slots 36 and secured by means of the set screws 28.

In this manner, the vertically positioned posts 41 are out of the way of the occupants of the automobile when the doors are being opened or closed thereby allowing the use of these units without inconvenience, and the units will thus be able to support very heavy weights etc. from the framework of the automobile.

Figure 6:
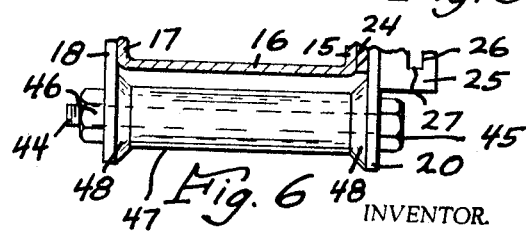
FIGURE 6 is a modification.

Further types of clamping arrangements could be used between the plates 18 and 20, FIGURE 6 showing a further modified form wherein the threaded bolts 44 are used having the bolt heads 45 and the nuts 46, these bolts passing through the spacer members 47, which spacer members can include the outwardly flared portions 48 for providing greater stability and strength.

It will now be noted that I have provided the advantages mentioned in the objects of my invention, with further advantages being apparent.

Some changes may be made in the construction and arrangement of the parts of my invention without departing from the real spirit and purpose of my invention.

I claim as my invention:

1. Support structure adapted to be clamped to lower automobile framework members of substantially rectangular cross section comprising spaced apart clamping means each including first plates adapted to engage one side of said framework member, second plates spaced from said first plates and having integral upper flanges but at substantially right angles to said plate, said flanges being adapted to engage upper corners of said frame members, means engaged between said first and second plates to clamp said plates onto said frame members, support means on said clamping means and elongated members extending between the support means on each clamping means, and load support means on said elongated members adapted to support carrying means above the automobile.

2. The device of claim 1 in which said support means include said second plates being formed to provide slots and said elongated members are of angular cross section having a portion thereof received in said slots.

3. The structure of claim 1, and wherein said clamping means include spaced bosses attached to each of said plates, said bosses having openings therein including oppositely pitched threads in oppositely positioned boss openings, turnbuckle screw elements engaging said threaded openings.

References Cited

UNITED STATES PATENTS

| | | | |
|---|---|---|---|
| 1,905,623 | 4/1933 | Deitz | 248—226.2 |
| 2,680,588 | 6/1954 | Wright | 248—226 |
| 3,091,421 | 5/1963 | Wolbers | 248—229 X |
| 3,279,636 | 10/1966 | Asman | 224—42.41 X |
| 3,353,778 | 11/1967 | Sylvain et al. | 248—226 X |

BENJAMIN HERSH, *Primary Examiner.*

J. A. PEKAR, *Assistant Examiner.*

U.S. Cl. X.R.

224—42.45; 248—229